Nov. 6, 1956 H. O. CARLSON 2,769,482
AUXILIARY SEATS FOR STROLLERS
Filed March 16, 1953 2 Sheets-Sheet 1

INVENTOR.
HARRY O. CARLSON
BY Henry L. Burkitt
ATTORNEY

Nov. 6, 1956
H. O. CARLSON
2,769,482
AUXILIARY SEATS FOR STROLLERS
Filed March 16, 1953
2 Sheets-Sheet 2
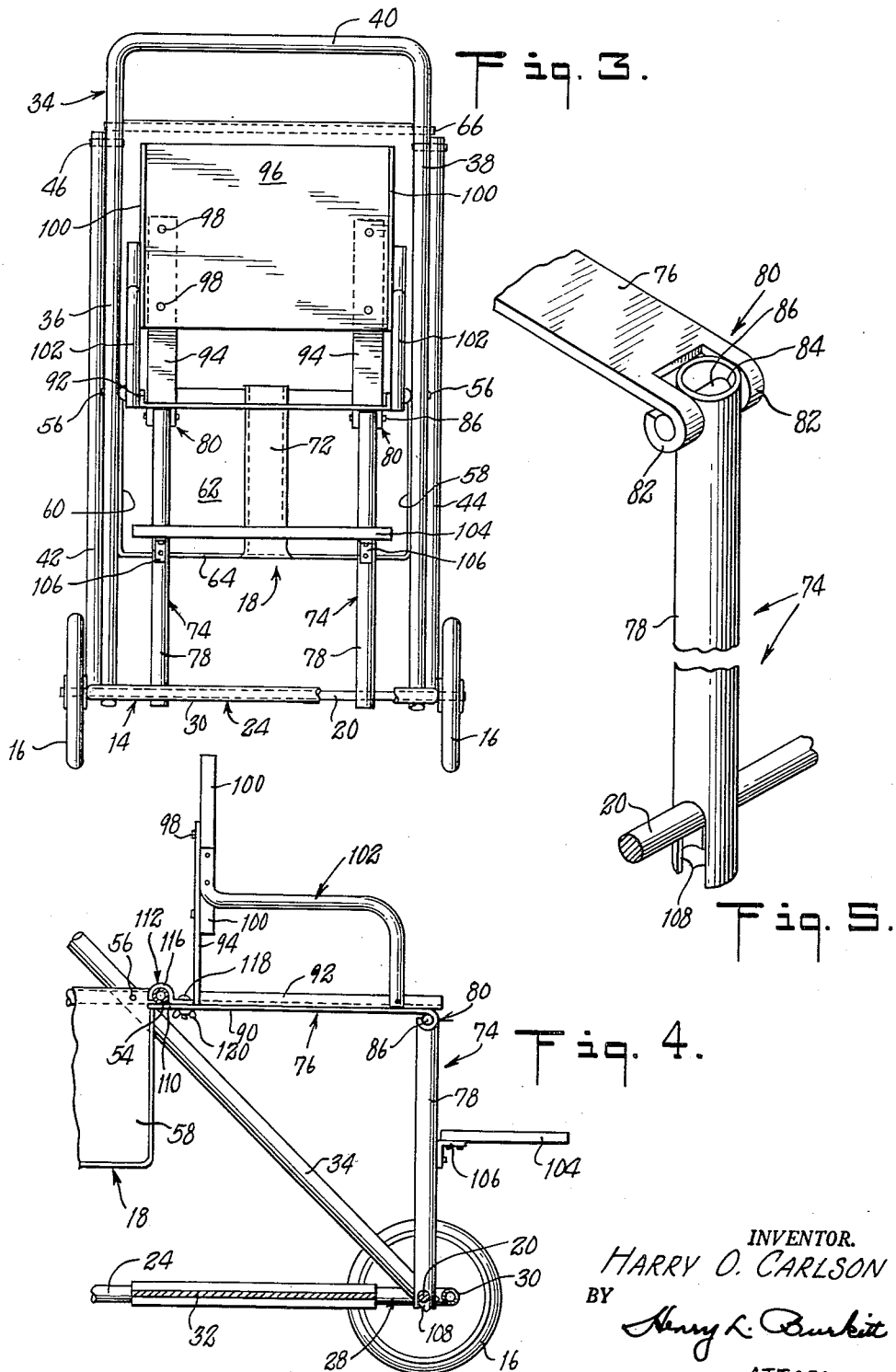
INVENTOR.
HARRY O. CARLSON
BY
Henry L. Burkitt
ATTORNEY

United States Patent Office 2,769,482
Patented Nov. 6, 1956

2,769,482

AUXILIARY SEATS FOR STROLLERS

Harry O. Carlson, Great Neck, N. Y.

Application March 16, 1953, Serial No. 342,383

4 Claims. (Cl. 155—10)

This invention relates generally to auxiliary seats for strollers.

An object of the invention is to provide an auxiliary seat for a baby stroller wherein a child may be seated comfortably on such seat while another child is seated on the ordinary seat of the stroller without interfering with his comfort, whereby the stroller with such attached seat may be utilized for carrying and transporting two children at the same time.

Another object of the invention is to provide an improved auxiliary seat for a stroller wherein means are disposed for quick and facile assembly of such auxiliary seat with, or removal from, the stroller, without requiring appreciable modification of the stroller structure, or interference with the normal use of the stroller.

Another object of the present invention is to provide an auxiliary seat attachable in the manner indicated, wherein the apparatus for attachment provides adjustability so that attachment to various and different strollers is made possible.

Another object of the invention is to provide an auxiliary seat of the type indicated which is simple in design and construction, economical to manufacture, and efficient in accomplishment of its intended purposes.

Other objects, features, and advantages of the invention will be set forth hereinafter, or will be apparent from the description and the drawings, in which is illustrated an embodiment of a construction for carrying out the invention.

The invention, however, is not intended to be restricted to any particular construction, or any particular arrangement of parts, or any particular application of such construction or arrangement of parts, or any specific method of operation or use, or any of the various details thereof, even where specifically shown and described herein; as the same may be modified in various particulars, or may be applied in many varied relations, without departing from the spirit and scope of the claimed invention, of which the exemplifying embodiment herein shown and described is intended only to be illustrative, and only for the purpose of complying with the requirements of the statutes for disclosure of an operative embodiment, but not to show all the various forms and modifications in which the invention might be embodied.

On the drawings, in which the same reference characters refer to the same parts throughout, and in which is disclosed such a practical construction:

Fig. 3 is a front view of the assembly, a part being broken away to clarify the construction;

Fig. 4 is a detail cross-sectional view, taken substantially on the line 4—4 of Fig. 1, certain parts being shown in elevation for clarity; and Fig. 5 is a fragmentary perspective view, to enlarged scale, showing part of the attaching means for the auxiliary seat.

Figure 1:
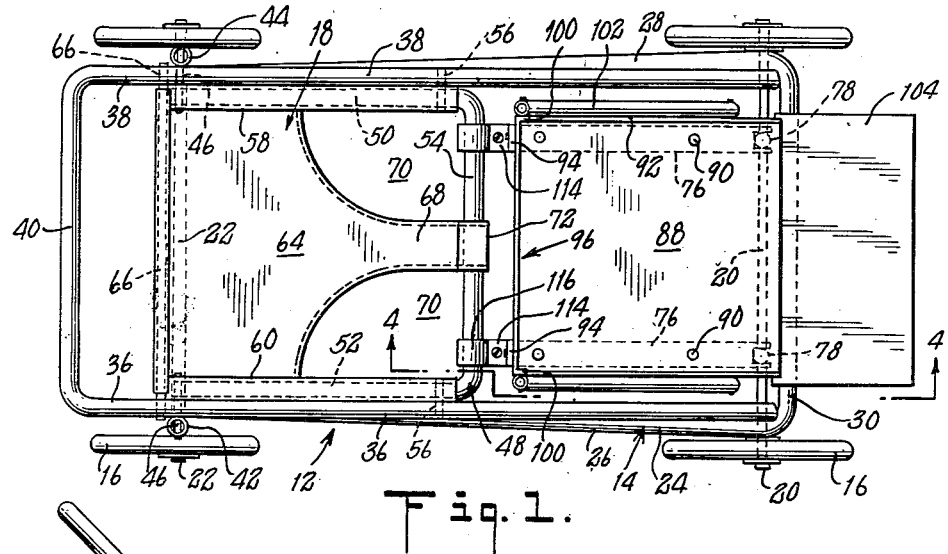
Fig. 1 is a top plan view of a stroller having an auxiliary seat mounted thereon in accordance with certain features of the invention.

Referring to the drawings in detail, an auxiliary seat 10 is provided detachably to be secured to a stroller 12, wherein the stroller may be conventional as to its particular construction. Stroller 12 may comprise a frame 14, mounted on wheels 16, to provide a relatively permanent seat 18 for a baby or child. Frame 14 may have a pair of laterally spaced axle members 20 and 22 upon which wheels 16 may be mounted in any conventional manner.

Carried on and held with respect to axles 20 and 22 is a bottom frame member 24; this frame member may be formed from tubing or like material, bent to be generally U-shaped. It may comprise a pair of laterally spaced legs 26 and 28 and a crossbar 30 connecting the legs at the front of the stroller. Legs 26 and 28 may be provided with apertures at longitudinally spaced points for the reception of the axles. A footrest 32 may be carried upon and extend between legs 26 and 28 at the forward portions thereof. The footrest may, for instance, be made of a piece of canvas having the side edges looped around legs 26 and 28, and stitched or otherwise secured in that relationship. The footrest is thus positioned forwardly of seat 18 comfortably to receive the feet of the child on that seat.

Extending rearwardly and upwardly from front axle 20 is a frame member 34, which may be made in a manner similar to frame member 24. It may be U-shaped, and include a pair of laterally spaced legs 36 and 38 extending from a crossbar 40 connecting those legs. Crossbar 40 may serve as a handle for the stroller. Legs 36 and 38 may be apertured at their lower ends to receive axle 20. To hold frame 34 in position, a pair of frame members 42 and 44 are positioned to extend vertically upwardly from axle 22.

Figure 2:
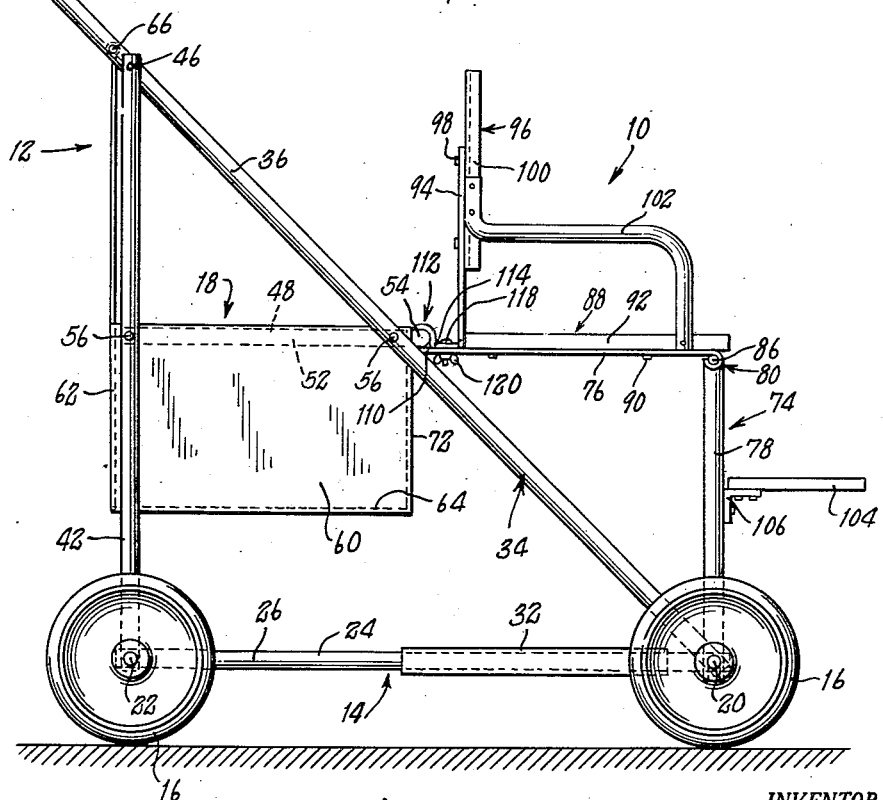
Fig. 2 is a side elevational view of the assembly shown in Fig. 1.

The upper ends of members 42 and 44 are secured to legs 36 and 38 by suitable means, such as pins 46. At their lower ends, members 42 and 44 are apertured to receive axle 22; by the manner of being secured to members 42 and 44, frame member 34 is supported in an inclined position (Fig. 2).

A seat support frame 48, generally U-shaped, may comprise a pair of laterally spaced legs 50 and 52 and a crossbar 54 connecting the legs. Legs 50 and 52 may be anchored by suitable means to frame 34 and members 42 and 44 by means of pins 56.

Seat 18 may be made from suitable material, as, for instance, from heavy fabric such as canvas. It may include a pair of side panels 58 and 60 and a rear panel 62. Each side panel may have its edge turned around the respective leg 50 or 52 on its particular side, and then hang down to and be secured to or form an extension of a bottom panel 64. Rear panel 62 may extend along the ends of and be secured to the end edges of panels 58 and 60, and then extend upwardly above panels 58 and 60 to a rod 66 extended between and secured in legs 36 and 38. Panel 62 may be looped over rod 66 and be secured there in the manner heretofore described for the other panels.

Panel 64 may terminate in a substantially narrowed forward portion 68 which, with panels 58 and 60, provides a pair of openings 70 through which the legs of a child on seat 18 may depend. Portion 68 may extend into an upwardly directed end 72 which is secured to crossbar 54 substantially centrally thereof. Crossbar 54 may constitute a handbar to be grasped by the child on seat 18.

Although a specific form of stroller has thus been illustrated and described, it is to be understood that strollers other than the specific one here described may utilize features of the invention.

Auxiliary seat 10 may be made to comprise a pair of laterally spaced frame members 74 which may be structurally identical. Each frame member includes a pair of pivotally connected links 76 and 78 which are disposed in substantially right angular relation when seat 10 is assembled with stoller 12 (Figs. 4 and 5). End 80 of link 76 may be wider than link 78; it may be cut away to provide a pair of bent ears 82 to provide means which, together with aligned apertures 84, receive a pin 86 for pivoting of the links with relation to each other.

Carried by links 76 and preferably secured thereto in any desired manner and extending between them is a platform or seat 88. Seat 88 may be formed of any suitable material and may be secured to links 76 by suitable means such as rivets 90. Seat 88 may be made of material such as sheet metal, and may have flanges 92 formed at its edges.

Secured and extending upwardly from links 76 may be uprights 94. Between the uprights may be a backrest 96 extending therebetween, and secured to the uprights by suitable means such as rivet 98. Links 76 and uprights 94 may be secured by any suitable means, as for instance, by spot welding.

Backrest 96 may be constructed in a manner similar to seat 88, and may be provided with flanges 100 at its edges. A pair of arm rests 102 may be formed from suitable material, such as metal tubing. The ends of the tubing may be flattened, and then riveted to flanges 92 and 100 by rivets passed through suitable openings in the flanges and the flattened ends.

A foot supporting platform 104 may be associated with links 78 in any desired manner. For instance, a bracket 106 may be secured to each link 78, and then platform 104 assembled on the brackets. The assembly of the platform with links 78, and of seat 88 and backrest 96 with links 76, provide a relatively sturdy, rigid structure.

In order to assemble the auxiliary seat with the carriage, the lower ends of links 78 may be slotted, as at 108, so that the ends of links may be seated upon axle 20. Links 76 extend beyond uprights 94 to provide extensions 110. A clamp portion 112 may be provided for assembly with each extension 110, and may include a flat segment 114 to rest upon the extension and an arcuate segment 116 which is intended to be complementary to crossbar 54. Extensions 110 and segments 114 are suitably apertured to receive bolts 118 with which wing nuts 120 are to cooperate. Thus, the auxiliary seat may be clamped positively in place, supported by crossbar 54 and axle 20 (Fig. 4). Links 78 are laterally spaced apart so as to engage with axle 20 inwardly of the point at which legs 36 and 38 are secured to that axle.

It will now be apparent that auxiliary seat 10 is adapted to be secured to stroller 12 by means of the cooperation of clamp portions 112 with crossbar 54 and of links 78 with axle 20. In practice, clamp portions 112 will be positioned upon spaced portions of crossbar 54 and then slots 108 will be engaged with spaced portions of axle 20 after pivoting links 78 into position to effect such interengagement. Obviously, other methods of assembly may be followed.

The pivotal relationship of links 76 and 78 provides adjustability between clamp portions 112 and slots 108 so that the auxiliary seat may be attached to various types of strollers having differently spaced axle members and seat members.

When secured to the stroller, seat 10 is positioned intermediately of axles 20 and 22. Thus, when a child is on the auxiliary seat, his center of gravity is between the axles. Thus auxiliary seat 10, when mounted upon a stroller, provides comfortable seating for one child on seat 10 while another child is on seat 18. Auxiliary seat 10 is capable of quick and facile assembly with or removal from the stroller, merely by manipulation of wing nuts 120 to release clamp portions 112 from crossbar 54, whereupon slots 108 may be disengaged from the front axle. Attachment of the auxiliary seat to the stroller requires no modification of the original structure, and does not interfere with its normal use.

Many other changes could be effected in the particular construction, and in the methods of use and construction and in specific details thereof, hereinbefore set forth, without substantially departing from the invention intended to be defined herein, the specific description being merely of an embodiment capable of illustrating certain principles of the invention.

What is claimed as new and useful is:

1. In combination with a stroller, the stroller comprising a base frame, wheels carried by the base frame, a plurality of interconnected strut members extending from and with the base frame forming a carriage frame and a handle for the stroller, substantially horizontal stay members carried by certain of the strut members, a main seat for the stroller carried by the stay members; of a pair of auxiliary seat frame members for association with the carriage frame, each auxiliary seat frame member comprising a pair of links, the links being pivotally connected to each other, an auxiliary seat carried by the links on each side of the carriage, one of these links anchoring it to a stay member, and the other of these links having means at its end for separably anchoring it to the base frame, the pivotal connection between the links providing means for accommodating the auxiliary seat positively to different distances between the stay members and the base frame.

2. In combination with a stroller, the stroller comprising a base frame, wheels carried by the base frame, a plurality of interconnected strut members extending from and with the base frame forming a carriage frame and a handle for the stroller, substantially horizontal stay members carried by certain of the strut members, a main seat for the stroller carried by certain of the stay members; of a pair of auxiliary seat frame members for association with the carriage frame, each auxiliary seat frame member comprising a pair of links, the links being pivotally connected to each other, an auxiliary seat carried by the links on each side of the carriage, one of these links having means at one end for separably anchoring it to one of said certain stay members, and the other of these links having means at its end for separably anchoring it to the base frame, the pivotal connection between the links providing means for accommodating the auxiliary seat positively to different distances between the seat members and the base frame.

3. In combination with a stroller, the stroller comprising a base frame including axles, wheels carried by the axles, a plurality of interconnected strut members extending from and with the base frame forming a carriage frame and a handle for the stroller, substantially horizontal stay members including a front stay member, the stay members being carried by certain of the strut members, a main seat for the stroller carried by certain of the stay members including said front stay member; of a pair of auxiliary seat frame members for association with the carriage frame, each auxiliary seat frame member comprising a pair of links, the links being pivotally connected to each other, an auxiliary seat carried by the links on each side of the carriage, one of these links having means at one end for separably anchoring it to the front stay member, and the other of these links having means at its end for separably anchoring it to an axle, the pivotal connection between the links providing means for accommodating the auxiliary seat positively to different distances between the front stay member and the axle.

4. In combination with a stroller, the stroller comprising a base frame incluuding axles, wheels carried by the axles, a plurality of interconnected strut members extending from and with the base frame forming a carriage frame and a handle for the stroller, substantially horizontal stay members including a front stay member, the stay members being carried by certain of the strut members, a main seat for the stroller carried by certain of the stay members including said front stay member; of a pair of auxiliary seat frame members for association with the carriage frame, each auxiliary seat frame member comprising a pair of links, the links being pivotally connected to each other, an auxiliary seat carried by the links on each side of the carriage, one of these links having means at one end for separably anchoring it to the front stay member, and the other of these links having a foot support intermediate its ends and means at its ends for separably anchoring that other link to an axle, the pivotal connection between the links providing means for accommodating the auxiliary seat positively to different distances between the front stay member and the axle.

References Cited in the file of this patent

UNITED STATES PATENTS

| | | | |
|---|---|---|---|
| D. 165,383 | Lorenzana | | Dec. 11, 1951 |
| 342,927 | Price | | June 1, 1886 |
| 643,373 | Gabriel et al. | | Feb. 11, 1900 |
| 780,175 | Hedstrom | | Jan. 17, 1905 |
| 995,363 | McCool | | June 13, 1911 |
| 1,062,227 | Daniels | | May 20, 1913 |
| 1,302,444 | Silvarman | | Apr. 29, 1919 |
| 1,695,409 | Banks | | Dec. 18, 1928 |
| 1,764,914 | Vande Mark | | June 17, 1930 |
| 2,499,007 | Stadelman | | Feb. 28, 1950 |
| 2,630,332 | Pettijohn | | Mar. 3, 1953 |